(12) United States Patent
Sisko

(10) Patent No.: US 7,581,857 B1
(45) Date of Patent: Sep. 1, 2009

(54) REMOVABLE BOAT TRAILER LIGHT

(76) Inventor: Tibor Frank Sisko, 5042 Jensen Rd., Castro Valley, CA (US) 94552

( * ) Notice: Subject to any disclaimer, the term of this patent is extended or adjusted under 35 U.S.C. 154(b) by 66 days.

(21) Appl. No.: 12/026,770

(22) Filed: Feb. 6, 2008

(51) Int. Cl.
*F21V 33/00* (2006.01)

(52) U.S. Cl. .................... 362/485; 362/477; 362/398

(58) Field of Classification Search ................ 362/477, 362/485, 486, 523, 540, 541, 549, 398
See application file for complete search history.

(56) References Cited

U.S. PATENT DOCUMENTS

| | | | |
|---|---|---|---|
| 3,887,093 A * | 6/1975 | Howell | 414/532 |
| 4,617,617 A | 10/1986 | Cunningham et al. | |
| 5,060,121 A | 10/1991 | Cunningham et al. | |
| 5,136,484 A | 8/1992 | Eaton | |
| 5,508,894 A | 4/1996 | Payne et al. | |
| 5,544,022 A * | 8/1996 | Blackard | 362/477 |
| 5,980,065 A | 11/1999 | Wooderson | |
| 5,980,073 A * | 11/1999 | Whipple | 362/485 |
| 6,273,588 B1 | 8/2001 | Arakelian | |
| 2003/0189836 A1* | 10/2003 | Sparling et al. | 362/485 |
| 2007/0139942 A1* | 6/2007 | Rowland et al. | 362/477 |

* cited by examiner

*Primary Examiner*—Laura Tso
(74) *Attorney, Agent, or Firm*—Daniel R. Richardson

(57) ABSTRACT

Small boats operated for pleasure are typically transported to the water on a boat trailer, where the boat trailer is backed into the water and the boat is floated off the boat trailer. A removable boat trailer tail light lighting system and method is disclosed that preserves the integrity of the tail light when the rear of a boat trailer is immersed in the water during launching of the transported boat. The invention is in two parts, with metallic plates affixed to the boat trailer, each metallic plate having a mounting frame with three rims that accommodate a magnetic metallic plate backing on the trailer tail light. The trailer tail light is removed prior to the trailer entering the water and re-inserted into the mounting frames on exit from the water.

6 Claims, 2 Drawing Sheets

REMOVABLE BOAT TRAILER LIGHT

CROSS-REFERENCE TO RELATED APPLICATIONS

None

FEDERALLY SPONSORED RESEARCH

N/A

SEQUENCE LISTING OR PROGRAM

N/A

BACKGROUND OF THE INVENTION

Figure 1:
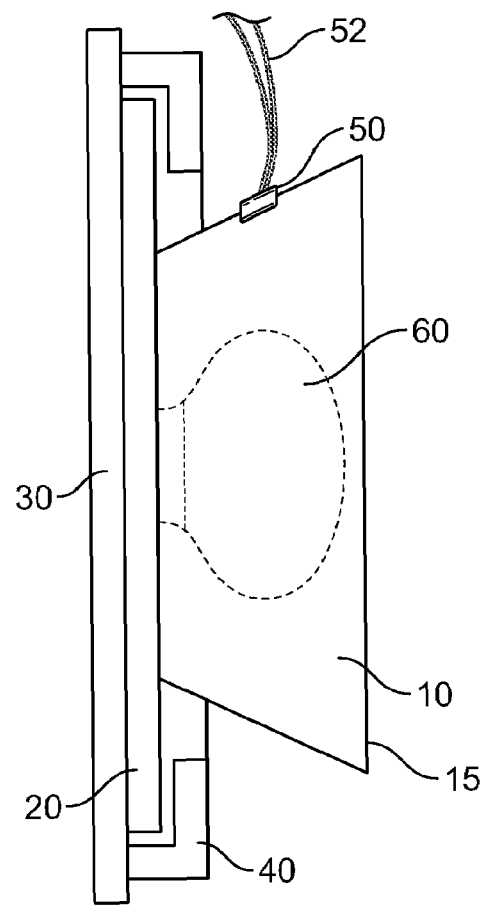

Small boats operated for pleasure are typically transported on a trailer, often called a "boat trailer", while hitched to a towing vehicle, to the location near the water where the boat will be placed in the water. At developed locations, there is a sloping, paved ramp into the water where the trailer, still hitched to the rear of the owner's vehicle, can be backed into the water and the boat released from the trailer to then float on the water at the base of the ramp.

During this process, the rear of the boat trailer is partially submerged in the water before the boat is released from the trailer. Since highway vehicle codes require that the boat trailer have tail lights and brake lights for the highway, the tail lights are typically submerged when the boat trailer is partially in the water.

Boat trailer lights run off direct current from the towing vehicle and the wires are typically not waterproof, nor is the connection to the lights, nor are the trailer lamps waterproofed. Thus, when an unaware vehicle operator backs into the water, and the backup lights are lit per the vehicle code, they oftentimes short circuit and blow out the lamps.

The present invention provides a convenient device and method to remove the boat tail light prior to being submerged and for convenient re-placement on exit from the water. Thus, the invention avoids short circuits and lamp blow-outs, while conforming with all applicable vehicle codes on the highway.

BACKGROUND OF THE INVENTION

Prior Art

This problem has had a number of patented solutions to enable the mounted tail lights to be waterproofed in some way. The principal problem solution has been to use a sealed boat trailer tail light unit that is submersible. U.S. Pat. No. 5,508,894 "Boat Trailer Light Assembly", issued Apr. 16, 1996 is typical of the prior art where the unit is basically waterproofed such that it can be submerged and still survive for re-use. The disclosure for this patent shows a vehicular submersible lamp assembly with a sealed external housing protecting the internal lamp bulbs and connected with a sealed electrical connection.

Another submersible lamp is disclosed in U.S. Pat. No. 6,273,588, issued on Aug. 14, 2001, to Richard Arakelian. This patent discloses a sealed housing for the lamps with a waterproofed electrical connection.

There is also a removable light disclosed in U.S. Pat. No. 5,980,073, "Boat Trailer Lighting System", issued Nov. 9, 1999. This patent discloses a removable light with a special bracket, bolted onto an outboard motor when the boat and motor are on the boat trailer. The special bracket and the attached light can then be removed before the boat trailer is submerged in the water. The outboard bracket is then re-installed on exit from the water with the boat. This approach only works with outboard motors and the removable light would not be useable without the boat on the trailer. However, the boat trailer has standard wired tail/brake lights which are not removable and thus have the same problem that the present invention solves.

SUMMARY

Drawings

Figures

FIG. 1—top view of removable trailer tail light inserted into mounting frame

Figure 2:
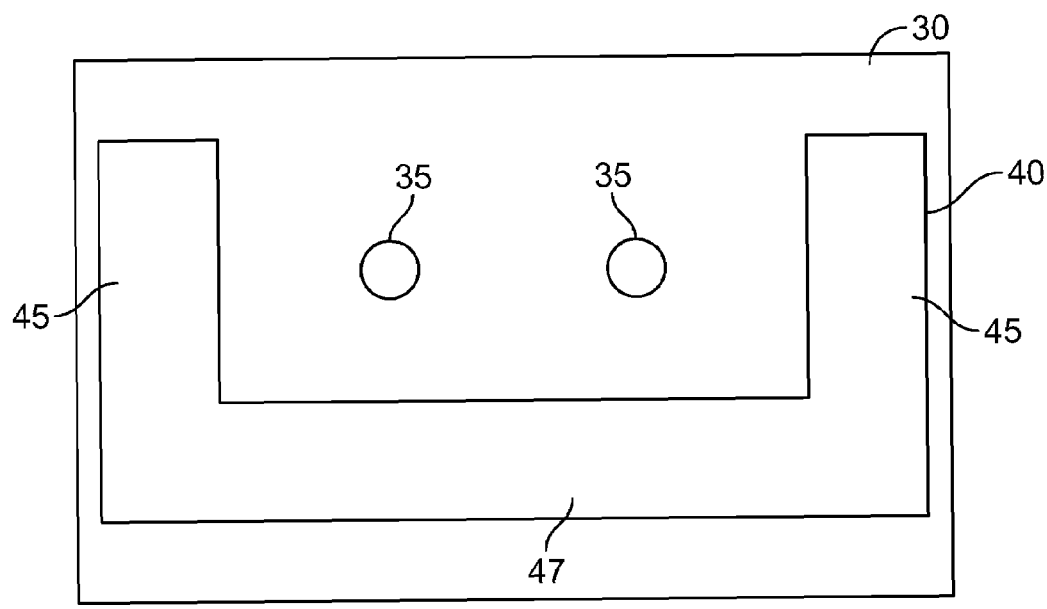

FIG. 2—horizontal view of trailer metal mounting plate with mounting frame

Figure 3:
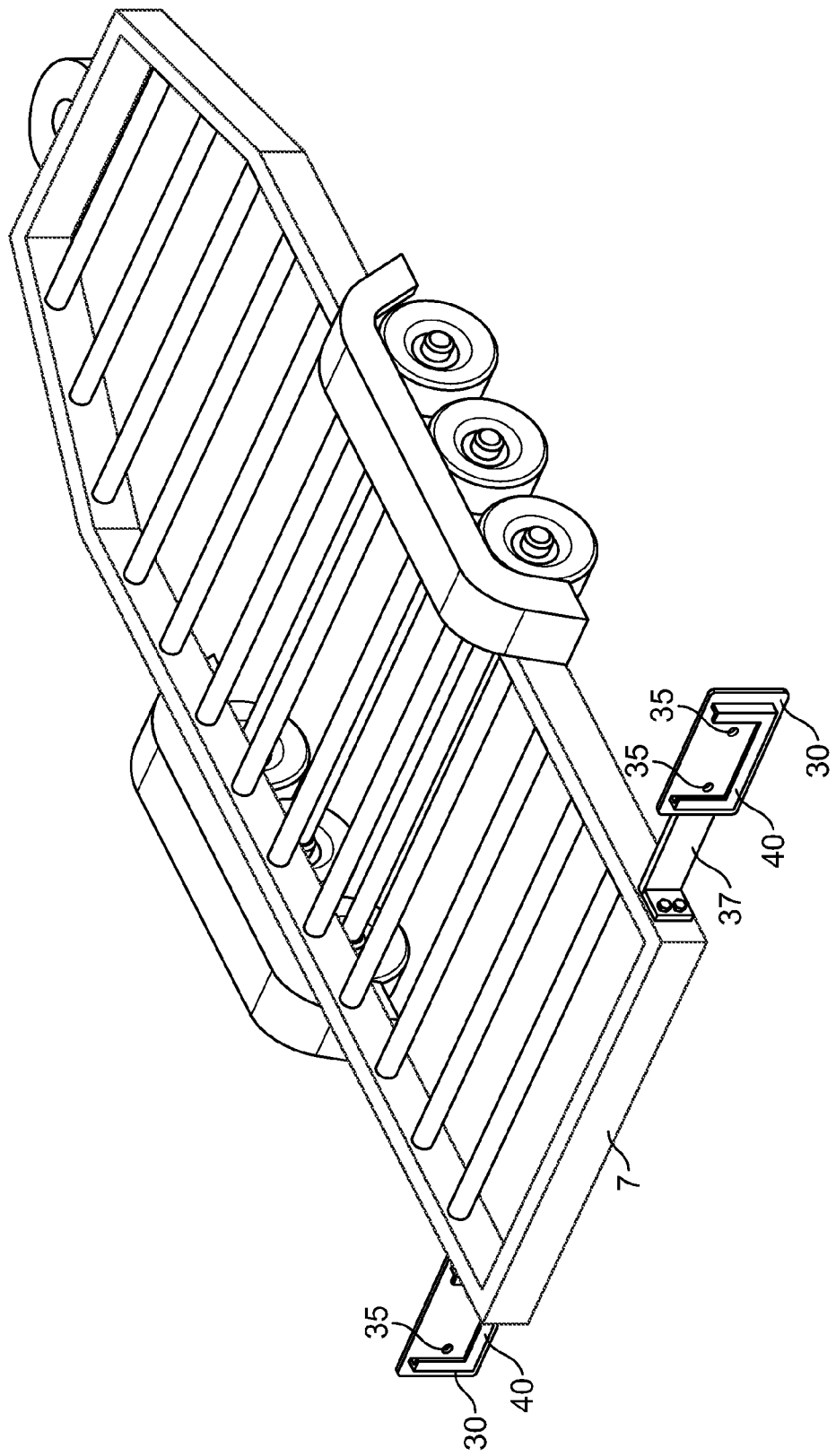

FIG. 3—perspective view of boat trailer with mounting plates installed

REFERENCE NUMERALS 7 boat trailer the trailer with the trailer tail light 10 mounted on each side of the rear of the boat trailer 7

10 trailer tail light comprises an enclosure 15, light bulbs 60, electrical connectors 52, and a magnetic plate 20.

15 trailer tail light enclosure the enclosure will typically be red see-through material such as plastic or glass, it is shown in a wedge shape for better visibility, but this shape is not required. The enclosure 15 includes one or more probably incandescent bulbs 60 for the purpose of lighting in low light or darkness conditions, and lighting when the towing vehicle's brakes are engaged by the operator. Depending on convenience and other factors, the tail light enclosure 15 might also be in sections to allow for white/clear backup lighting 20 trailer tail light magnetic plate is the metal plate that the trailer tail light 10 enclosure 15 is mounted to. This trailer tail light magnetic plate 20 will be magnetized to assure that it stays anchored to the trailer metal mounting plate 30 when it is inserted into the mounting frame 40.

30 trailer metal mounting plate is the metal plate affixed to the rear of the boat trailer that holds the mounting frame 40 and makes contact with the trailer tail light magnetic plate 20. It must be metal in order to "stick" to the magnetized trailer tail light magnetic plate 20 through magnetism.

35 mounting plate bolt holes are the openings on the trailer metal mounting plate 30 for insertion of probably threaded bolts to affix the trailer metal mounting plate 30 to the boat trailer 7 with angle brackets—or other means 37 angle bracket is a standard "L" type angle bracket with bolts and nuts used to affix the trailer metal mounting plate 30 to the boat trailer 7

40 mounting frame is the three-sided frame following the general shape of a rectangle or a square designed to fit over the edges of the trailer tail light magnetic plate 20 when the trailer tail light 10 is inserted into the mounting frame 40

45 mounting frame upright support side is one of the two support sides comprising the upright portion of the mounting frame 40. These support sides are basically inverted "L" shaped with the top of the "L" facing sideways and inward, and thus forming a rim on each upright support side to insert the trailer tail light magnetic plate 20 to mount the trailer tail light 10 flush against the trailer metal mounting plate 30 with the magnetism of the trailer tail light magnetic plate 20 to assure that the trailer tail light 10 doesn't bounce out of the mounting frame 40 due to road vibration when in use.

47 mounting frame bottom support side is the support side on the bottom of the mounting frame 40. This support side is basically an inverted "L" shape with the top of the "L" facing upwardly and inward, and thus forming a rim on the bottom support side to allow insertion of the trailer tail light magnetic plate 20

50 electrical connector opening is the access port or other type of opening in the trailer tail light 10 enclosure through which the electrical connectors 52 are inserted and connected to the trailer tail light bulb(s) 60

52 electrical connectors are typically copper wires sheathed in plastic or vinyl that conduct the electrical current from the boat trailer to the trailer tail light 10 to light the bulb(s) 60

60 tail light bulb is one or more incandescent bulbs mounted inside the trailer tail light 10 enclosure and connected by the electrical connectors 52 to the boat trailer source of electrical current to light the bulbs 60 for warning, backup, or braking purposes.

DETAILED DESCRIPTION

Preferred Embodiment

The present invention provides a convenient device and method to remove the boat trailer tail light 10 prior to being submerged along with the boat trailer 7 and for convenient re-placement on exit from the water. Thus, the invention avoids short circuits and lamp blow-outs, while conforming with all applicable vehicle codes on the highway. The boat trailer 7 is equipped with two trailer metal mounting plates 30, one on each side of the rear of the boat trailer. These trailer metal mounting plates 30 will be steel or stainless steel so as to be capable of magnetic attraction.

In the preferred embodiment, each trailer metal mounting plate 30 is about 12 inches wide and 6 inches high. The two trailer metal mounting plates 30 are affixed to the rear of the boat trailer by ¼ inch by 4 inch screws. The screws are inserted into ½ inch countersunk openings 35 in the steel where the openings are about ¼ inch from the outer edge of the trailer metal mounting plate 30. The screw openings 35 are spaced equally along all four sides of the trailer metal mounting plates 30, with 4 to 5 screws on each side.

Each trailer metal mounting plate 30 has a mounting frame 40 affixed to it, probably by welds, but it could be by nuts and bolts or other method. The mounting frame 40 is either square or rectangular in shape without a top side. The bottom side of the mounting plate 30 is about 4¼ inches wide. The two sides of the mounting frame 40 are at right-angles to the bottom side and are about 3 inches in height. The mounting frame's 40 two upright support sides 45 and one bottom support side 47 are basically inverted "L" shaped with the top of the side 45, 47 about ½ inch in width and the support portion being ¼ inch. The inside height from the plate 30 to the lower surface of the mounting frame side 45, 47 is ⅝ inch. Thus, the mounting frame 40 provides a rim on both upright sides 45 and the bottom side 47 such that the trailer tail light magnetic plate 20 can slide under the rims and the trailer tail light magnetic plate 20 will then adhere to the trailer metal mounting plate 30 and be held in place by both the magnetism and the mounting frame 40.

The trailer tail light 10 comprises an enclosure 15, light bulbs 60, electrical connectors 52, and a magnetic plate 20. The trailer tail light enclosure 15 will typically be red transparent material such as plastic or glass. The trailer tail light enclosure 15 is shown (FIG. 1) in a wedge shape for better visibility, but this shape is not required. The enclosure 15 includes one or more probably incandescent bulbs 60 for the purpose of lighting in low light or darkness conditions, and lighting when the towing vehicle's brakes are engaged by the operator. Depending on convenience and other factors, the trailer tail light enclosure 15 might also be in sections/partitions to allow for white/clear backup lighting The trailer tail light 10 is removable from the trailer metal mounting plate's 30 mounting frame 40 prior to the rear of the boat trailer being immersed in the water when launching the boat. The trailer tail light 10 electrical connectors 52 are sufficiently long enough to allow the removed trailer tail light 10 to be stowed on the boat trailer above the water line even when the boat trailer is backed into the water.

DETAILED DRAWINGS

FIG. 1 provides a top view of the trailer metal mounting plate 30 with the removable trailer tail light 10 and its trailer tail light magnetic plate 20 inserted into the mounting frame 40. The trailer tail light 10 is shown with the trailer tail light enclosure 15 in a wedge shape, enclosing a single tail light bulb 60 and the electrical connector opening 50 with electrical connectors 52 entering the enclosure for connection to the tail light bulb 60.

FIG. 2 provides a horizontal view of the trailer metal mounting plate 30 with mounting frame 40. The mounting frame 40 components are displayed, showing the two mounting frame upright support sides 45 and the single mounting frame bottom support side 47. The trailer metal mounting plate 30 is anchored to a support, such as an angle bracket 37 (FIG. 3), affixed to the boat trailer 7 (FIG. 3). The means for affixing the trailer metal mounting plate 30 to the angle bracket 37 (FIG. 3) is by inserting screws or bolts through the mounting plate bolt holes 35.

FIG. 3 is a perspective view of the boat trailer 7 with trailer metal mounting plates 30 installed using the angle brackets 37. The trailer metal mounting brackets 30 along with two mounting plate bolt holes 35, are shown with the mounting frame 40 components including the two mounting frame upright support sides 45 and the single mounting frame bottom support side 47.

I claim:

1. A removable boat trailer tail light lighting system comprising:

a boat trailer for transporting a boat having a metallic plate affixed on either side of the rear of said boat trailer, each said metallic plate composed of materials capable of magnetic attraction;

a three-sided mounting frame affixed to each said metallic plate, with two upright sides having open inwardly facing rims elevated from said metallic plate and affixed on either side of said mounting frame to a bottom support side having an inwardly facing rim elevated from said metallic plate and said mounting frame being open on the top; and a trailer tail light backed with a magnetized metal plate and mounted thereon a transparent enclosure incorporating one or more incandescent lamps with electrical connection means for connecting said incandescent lamps to the trailer electrical power source.

2. A removable boat trailer tail light lighting system as in claim 1, wherein the elevation of said rims from said metallic plates accommodates insertion of said trailer tail light magnetized metal plate under said rims.

3. A removable boat trailer tail light lighting system as in claim 1, wherein said metallic plate affixed on either side of the rear of said boat trailer is composed of stainless steel.

4. A removable boat trailer tail light lighting system as in claim 1, wherein said transparent enclosure is tinted red.

5. A removable boat trailer tail light lighting system as in claim 1, wherein said transparent enclosure is divided into two partitions, wherein one partition is tinted red, and wherein the second partition is either clear or tinted white.

6. A method for using a removable boat trailer tail light lighting system comprising the steps of:
- installing a metallic plate on either side of the rear of a boat trailer, each said metallic plate composed of materials capable of magnetic attraction;
- each said metallic plate incorporating a three-sided mounting frame affixed to each said metallic plate, with two upright sides having open inwardly facing rims elevated from said metallic plate and affixed on either side of said mounting frame to a bottom support side having an inwardly facing rim elevated from said metallic plate and said mounting frame being open on the top;
- inserting a trailer tail light for use in operating a boat trailer, wherein said trailer tail light is backed with a magnetized metal plate and mounted thereon a transparent enclosure incorporating one or more incandescent lamps with electrical connection means for connecting said incandescent lamps to the boat trailer electrical power source, into and under the rims of said three-sided mounting frame; and
- removing said trailer tail light prior to said rear of a boat trailer being immersed in water.

* * * * *